L. H. BALWICK.
PEACH TURNING APPARATUS.
APPLICATION FILED MAR. 12, 1917.
1,278,291.
Patented Sept. 10, 1918.
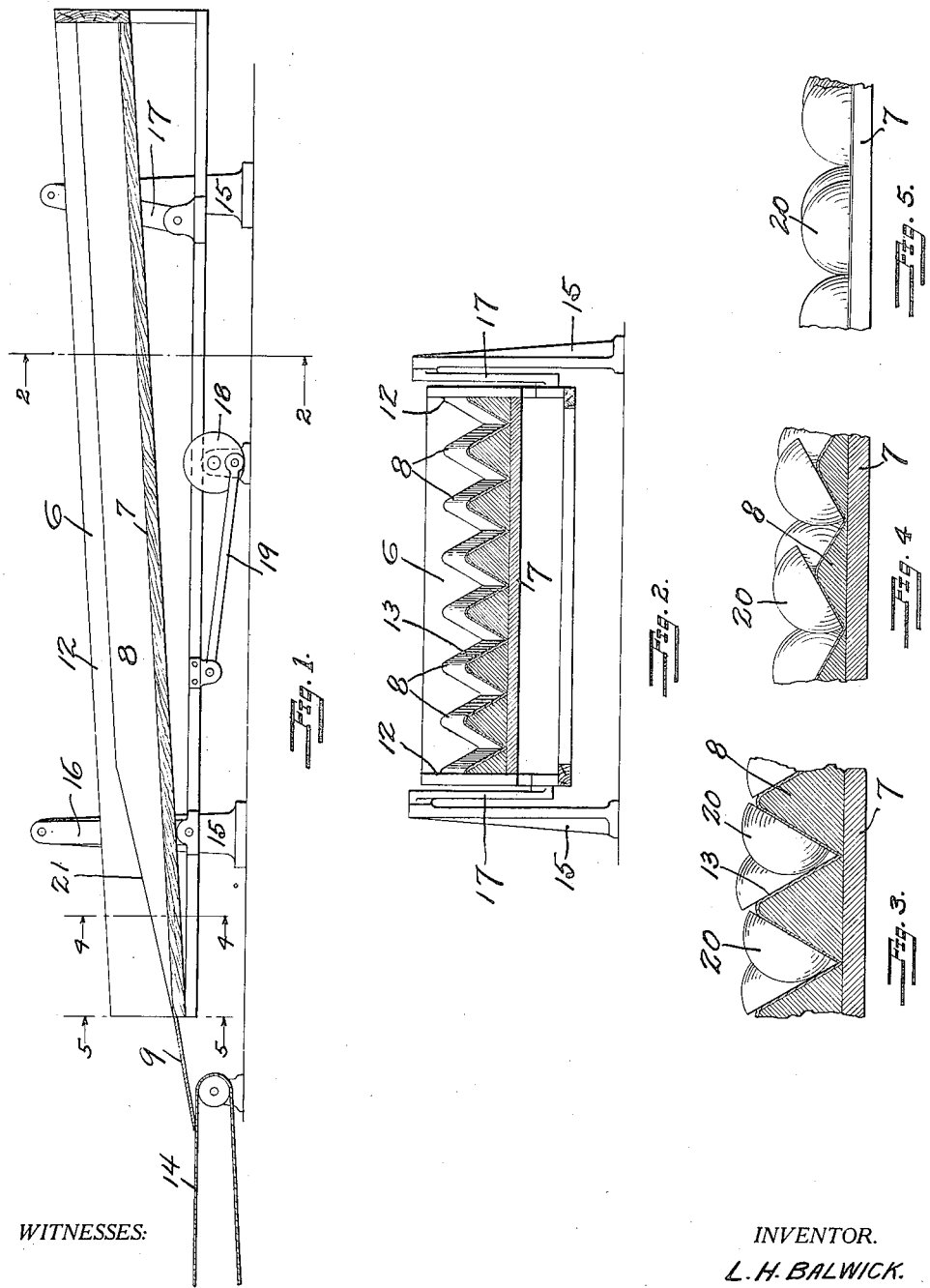
WITNESSES:
INVENTOR.
L. H. BALWICK.
BY
HIS ATTORNEYS.

UNITED STATES PATENT OFFICE.

LOUIS H. BALWICK, OF OAKLAND, CALIFORNIA, ASSIGNOR TO PREMIER MACHINERY COMPANY, OF OAKLAND, CALIFORNIA, A CORPORATION OF CALIFORNIA.

PEACH-TURNING APPARATUS.

1,278,291.     Specification of Letters Patent.     Patented Sept. 10, 1918.

Application filed March 12, 1917. Serial No. 154,417.

*To all whom it may concern:*

Be it known that I, LOUIS H. BALWICK, a citizen of the United States, and a resident of Oakland, county of Alameda, and State of California, have invented a certain new and useful Peach-Turning Apparatus, of which the following is a specification.

The invention relates to an apparatus for turning half peaches or other similar fruit, so that the peaches are all turned into the same position.

An object of the invention is to provide an apparatus for turning half peaches so that all of the halves are similarly disposed.

Another object of the invention is to provide an apparatus which receives indiscriminately - positioned half peaches and discharges uniformly-positioned half peaches.

The invention possesses other advantageous features, which, with the foregoing, will be set forth at length in the following description where I shall outline in full, that form of the invention which I have selected for illustration in the drawings accompanying and forming part of the present specification. In the drawings I have shown one form of the apparatus of my invention, but it is to be understood that I do not limit myself to such form, since the invention as expressed in the claims may be embodied in a plurality of forms.

Referring to said drawings:

Figure 1 is a vertical, longitudinal section of the apparatus of my invention.

Fig. 2 is a vertical transverse section taken on the line 2—2, Fig. 1.

Fig. 3 is a fragmentary section of the apparatus on the line 2—2, showing the position of the half peaches.

Figs. 4 and 5 are similar sections on the lines 4—4 and 5—5.

In certain operations in the canning of peaches, the peeled halved peaches are indiscriminately positioned and it is essential for further operation that they be uniformly positioned and the purpose of the present apparatus is to produce this result. Peaches are frequently sliced before canning and it is desirable to uniformly position the half peaches before they are fed to the slicing machines.

The apparatus of my invention comprises a table 6 having a transversely serrated bottom formed by a plurality of contiguous parallel longitudinally - disposed V - shaped grooves. The grooves are preferably formed by securing to the bottom 7 of the table, a plurality of longitudinally - disposed contiguous triangular strips 8, arranged with an apex of the triangle upward. At the discharge end of the table the strips are gradually lessened in height, so that the V-shaped grooves gradually flatten out and merge into a flat surface, which may be the bottom 7 of the table or the discharge apron 9. The table is provided with standing sides 12 which prevent the peaches from discharging at the sides. The strips 8 are preferably covered with a smooth sheet metal-wearing surface 13. The depth of the grooves at their deepest part is greater than one-half the diameter of the peaches and preferably about three inches, but this measurement may be varied on different tables as desired.

The table is preferably inclined downward slightly toward the discharge end to increase the rate at which the peaches travel along the grooves to the discharge apron 9. The apron overlies a conveyer belt 14 onto which the half peaches slide from the apron and on which they are carried to the slicers or other apparatus.

Means are provided for shaking the table longitudinally and for simultaneously giving the head or feed end thereof an upward kick to cause the peaches to slide toward the discharge end. For this purpose the table is mounted on links which are pivoted to standards 15 arranged on opposite sides thereof and extending above the table. The links 16 at the discharge end of the table oscillate through an arc which extends to both sides of the perpendicular through the upper pivot of the links. The links 17 at the upper or head end of the table oscillate through an arc which lies to one side of the perpendicular through the upper pivot of the links, thereby giving the head end of the table an upward kick. The links 17 are preferably so arranged that the head end of the table is kicked upwardly as it moves toward the discharge end. The table is moved longitudinally by the crank 18 which is connected to the table by the link 19.

The indiscriminately - positioned peeled half peaches 20 are dumped or fed onto the table at its head end and due to the movement of the table and the slippery nature of the half peach, they soon assume the positions indicated in Fig. 3, the flat sides of the peach halves lying against the inclined sides of the grooves. When the half peaches, so positioned, reach the tapered portion 21 of the strips, they are gradually turned down until they lie flat on their flat faces, as shown in Fig. 5 and in that position are delivered to the conveyer belt or other receiving device.

I claim:

1. In an apparatus for turning half peaches, a table, means for causing said peaches to move along said table, said table being provided with a plurality of longitudinal grooves of gradually decreasing depth, whereby said half peaches are turned from an upright position in the deeper portions of the grooves to a horizontal position at the ends of said grooves.

2. In an apparatus for turning half peaches, a table, means for shaking the table to cause said peaches to travel across the table, said table being provided with a plurality of longitudinal grooves of gradually decreasing depth, whereby said half peaches are turned from an upright position in the deeper portions of the grooves to a horizontal position at the ends of said grooves.

3. In an apparatus for turning half peaches, a table, provided with a plurality of longitudinally disposed parallel contiguous grooves of gradually decreasing depth whereby said half peaches are first supported in said grooves on their edges and means for shaking said table whereby said half peaches move along said grooves to a horizontal position at the ends thereof.

4. In an apparatus for turning half peaches, a table provided with a plurality of longitudinal V-shaped grooves of gradually decreasing depth whereby said half peaches are first supported in said grooves with the flat side of the peach lying against one of the walls thereof, and means for shaking the table to cause said half peaches to move along said grooves, whereby the flat sides of said peaches gradually approach a horizontal position as the depth of the groove decreases.

5. In an apparatus for turning half peaches, an inclined table having a plurality of grooves of gradually decreasing depth disposed in the direction of its inclination, whereby said half peaches are first supported in said grooves on their edges, and means for shaking said table whereby said half peaches move along said grooves to a horizontal position at the ends thereof.

6. In an apparatus for turning half peaches, an inclined table having a plurality of V-shaped grooves of gradually decreasing depth disposed in the direction of its inclination, whereby said half peaches are first supported in said grooves with the flat side of the peach lying against one of the walls thereof, and means for shaking the table in the direction of its inclination to cause said half peaches to move along said grooves, whereby the flat sides of said peaches gradually approach a horizontal position as the depth of the groove decreases.

7. In an apparatus of the character described, a table having a plurality of longitudinally-disposed grooves of gradually decreasing depth, means for shaking the table longitudinally, and means for giving the head end of the table an upward and downward motion.

8. In an apparatus of the character described, a table having a plurality of longitudinally-disposed grooves of gradually decreasing depth, and means for giving the table a longitudinal pitching motion.

9. In an apparatus of the character described, a table having a plurality of longitudinally-disposed grooves of gradually decreasing depth, links supporting the table adjacent the head and discharge ends, said links being arranged to impart vertical movement in different degrees to the opposite ends of the table and means for oscillating the table longitudinally.

In testimony whereof, I have hereunto set my hand at Oakland, California, this 28th day of February, 1917.

LOUIS H. BALWICK.